(12) United States Patent
Keller et al.

(10) Patent No.: US 11,486,059 B2
(45) Date of Patent: Nov. 1, 2022

(54) METHOD AND DEVICE FOR STABILIZING PRECURSOR FIBERS FOR THE PRODUCTION OF CARBON FIBERS

(71) Applicant: CENTROTHERM INTERNATIONAL AG, Blaubeuren (DE)

(72) Inventors: Andreas Keller, Opfingen (DE); Gunter Fauth, Urbach (DE); Uwe Ziegler, Blaubeuren (DE)

(73) Assignee: CENTROTHERM INTERNATIONAL AG, Blaubeuren (DE)

( * ) Notice: Subject to any disclaimer, the term of this patent is extended or adjusted under 35 U.S.C. 154(b) by 0 days.

(21) Appl. No.: 16/970,411

(22) PCT Filed: Mar. 11, 2019

(86) PCT No.: PCT/EP2019/055993
§ 371 (c)(1),
(2) Date: Aug. 17, 2020

(87) PCT Pub. No.: WO2019/170909
PCT Pub. Date: Sep. 12, 2019

(65) Prior Publication Data
US 2020/0399790 A1    Dec. 24, 2020

(30) Foreign Application Priority Data
Mar. 9, 2018   (DE) .......................... 102018203630.6

(51) Int. Cl.
*B29C 71/02* (2006.01)
*F27B 5/04* (2006.01)
(Continued)

(52) U.S. Cl.
CPC ............. *D01F 9/225* (2013.01); *D01D 10/02* (2013.01); *D01F 9/17* (2013.01); *D01F 9/324* (2013.01);
(Continued)

(58) Field of Classification Search
CPC ............... B29C 71/0009; B29C 71/02; B29C 2791/006; D02J 13/00; F27B 5/04;
(Continued)

(56) References Cited

U.S. PATENT DOCUMENTS 5,078,926 A *  1/1992  McHenry ................ D01F 9/225
                                                     264/83 X
7,534,854 B1   5/2009  Paulauskas et al.
(Continued)

FOREIGN PATENT DOCUMENTS

GB        1194176       6/1970
GB        2529105       2/2016
WO     2008084732       7/2008

*Primary Examiner* — Leo B Tentoni
(74) *Attorney, Agent, or Firm* — Tarolli, Sundheim, Covell & Tummino LLP

(57) ABSTRACT

The invention relates to a method and to a device for stabilizing precursor fibers for the production of carbon fibers. In the method, precursor fibers are first heated to a first temperature and held at the temperature for a predefined duration. Subsequently, the precursor fibers are heated to at least one second temperature, which is higher than the first temperature, and held at said temperature for a predefined duration. During each heating and between the heating steps, the precursor fibers are in a gas atmosphere having a negative pressure in the range between 12 mbar and 300 mbar and having an oxygen partial pressure of 2.5 to 63 mbar. The device has at least one evacuable, elongate vacuum chamber for feeding the precursor fibers through, at least two lock units and at least one heating unit. At least one lock unit is used for the sealed insertion of precursor fibers (Continued)

into the at least one vacuum chamber, while at least one other lock unit is used for the sealed removal of precursor fibers from the at least one vacuum chamber. The heating unit has at least two individually controllable heating elements, which are suitable for heating the at least one vacuum chamber to at least two different temperatures in heating zones which are adjacent in the longitudinal direction.

22 Claims, 5 Drawing Sheets

(51) Int. Cl.
| | |
|---|---|
| *F27B 9/04* | (2006.01) |
| *F27B 9/28* | (2006.01) |
| *F27D 7/06* | (2006.01) |
| *D01F 9/22* | (2006.01) |
| *D01D 10/02* | (2006.01) |
| *D01F 9/17* | (2006.01) |
| *D01F 9/32* | (2006.01) |
| *B29C 71/00* | (2006.01) |
| *D02J 13/00* | (2006.01) |
| *F27B 9/12* | (2006.01) |

(52) U.S. Cl.
CPC .............. *D01F 9/328* (2013.01); *F27B 9/042* (2013.01); *F27B 9/045* (2013.01); *B29C 71/0009* (2013.01); *B29C 2791/006* (2013.01); *D02J 13/00* (2013.01); *D10B 2101/12* (2013.01); *F27B 2009/122* (2013.01); *F27D 2007/066* (2013.01)

(58) Field of Classification Search
CPC .. F27B 9/04; F27B 9/042; F27B 9/045; F27B 2009/122; F27B 9/28; F27D 7/06; F27D 2007/066
USPC ....... 264/83, 101, 345; 425/143, 445; 432/8, 432/24, 49, 152, 200, 205
See application file for complete search history.

(56) References Cited

U.S. PATENT DOCUMENTS

| | | | |
|---|---|---|---|
| 9,190,222 B1* | 11/2015 | Zhang | .................... D01D 5/003 |
| 2018/0175391 A1 | 6/2018 | Komura et al. | |
| 2020/0248339 A1* | 8/2020 | Atkiss | .................... C01B 32/05 |
| 2020/0354859 A1* | 11/2020 | Gooden | .................... F27B 5/04 |

* cited by examiner

METHOD AND DEVICE FOR STABILIZING PRECURSOR FIBERS FOR THE PRODUCTION OF CARBON FIBERS

RELATED APPLICATIONS

This application corresponds to PCT/EP2019/055993, filed Mar. 11, 2019, which claims the benefit of German Application No 10 2018 203 630.6, filed Mar. 9, 2018, the subject matter of which are incorporated herein by reference in their entirety.

BACKGROUND OF THE INVENTION

It is known to produce carbon fibers from different precursor materials. Carbon fibers are produced in several process steps. The starting material is usually polyacrylonitrile, in short PAN, but other precursors, especially lignin, cellulose and polyethylene are also being considered as alternatives for the production of carbon fibers.

As a first step in the production process, the starting materials are formed into so-called precursor fibers. These precursor fibers are subsequently converted into carbon fibers in two further steps in separate production line sections. The first step is called stabilization while the second is called carbonization. While carbonization usually takes place at high temperatures above 1300° C., stabilization, which leads to stabilization and crosslinking, respectively, of the precursor fibers, takes place at much lower temperatures, usually in the range of 200° C. to 300° C. This step is necessary to change the molecular structures of the precursor fibers in such a way that the fibers can withstand the thermal stress during carbonization. Stabilization is usually carried out in a circulating air oven having zones, which may be heated separately or independently. In these zones the precursor fibers are heated to temperatures between 200° C. and 300° C. and react with the oxygen in the air at atmospheric pressure. In the stabilization process gaseous reaction products such as carbon dioxide, hydrocyanic acid, carbon monoxide and ammonia may be generated, which must be exhausted and disposed of in a controlled manner. This results in a complex and expensive exhaust gas treatment. Currently, the stabilization step is the most costly and time-consuming step in the production of a carbon fiber. Attempts to reduce the reaction time seem to make sense, but do present challenges.

In the case of PAN as the precursor material, an oxidation reaction with externally supplied oxygen takes place during stabilization. Oxygen builds itself into the chemical structure of the polymer and finally forms water with the existing hydrogen in the carbonization step, which follows the stabilization step. Therefore, a controlled oxidation is advantageous to introduce an optimal amount of oxygen. An excess of oxygen can reduce the quality of the carbon fiber, as it oxidizes the carbon excessively.

Other precursors, which already contain oxygen, such as lignin or cellulose, do not necessarily require externally supplied oxygen for the stabilization, but stabilization may potentially be accelerated by externally supplied oxygen. In all cases of stabilization, the structure of the precursor becomes denser.

In the light of economic efficiency, rapid stabilization is desired, but from a chemical point of view it poses problems. In the worst case, the structure of the fiber densifies so strongly on its surface that the absorption of oxygen and the removal of product gases during stabilization are hindered by the formation of a fiber shell.

A reduction of the residence time in the circulating air oven under conventional conditions may therefore not be expedient. It is also not possible to increase the process temperature, since the stabilization reaction in the case of PAN is highly exothermic and too high a temperature may lead to a spontaneous and uncontrolled release of energy, which can cause the fiber material to ignite.

SUMMARY OF THE INVENTION

It is therefore an object of the present invention to overcome or lessen one or more of the problems of the prior art. According to the invention, a method according to claim 1 and a device according to claim 14 are provided. Further embodiments of the invention are inter glia disclosed in the dependent claims.

The method provides stabilization under controlled and precisely defined process conditions and at temperatures that are in part higher than the usual state-of-the-art temperatures, Precursor fibers which were processes accordingly showed a high density and uniformity in a reproducible manner, whereby the subsequently carbonized fibers showed excellent strength values.

In particular, the method for stabilizing precursor fibers for the carbon fiber production comprises the following steps: heating the precursor fibers to a first temperature and maintaining the temperature for a predetermined period of time; and subsequently heating the precursor fibers to at least a second temperature higher than the first temperature and maintaining the temperature for a predetermined period of time; wherein the precursor fibers are in a gas atmosphere with a negative pressure in a range between 12 mBar and 300 mBar during the respective heating and between the heating steps. State of the art problems can be reduced or solved by the process by carrying out the stabilization under a defined process atmosphere in negative pressure, especially with lower oxygen partial pressure. This in particular enables the use of higher temperatures.

Preferably, during the respective heating and between the heating steps, the precursor fibers are in a gas atmosphere with a negative pressure in the range between 50 mBar and 200 mBar.

In one embodiment, the precursor fibers are heated from the first temperature to the second temperature via at least one further intermediate temperature, wherein the temperature difference between successive stages in time are at least 5° C., in particular at least 10° C., and the precursor fibers are kept at the at least one intermediate temperature for a predetermined period of time. A multi-stage temperature increase has proven to be particularly advantageous. Preferably, the second temperature is at least 30° C., and in particular at least 40° C. higher than the first temperature. For good process results, the precursor fibers are preferably kept at the first temperature, the second temperature and at least one optional intermediate temperature for at least 10 minutes, preferably for at least 20 minutes.

For PAN fibers, the first temperature should be in the range of 220 to 320° C. and the second temperature should be in the range of 280 to 400° C. Particularly good results were achieved when the first temperature was in the range of 260 to 320° C. and the second temperature in the range of 300 to 380° C.

For precursor fibers based on cellulose and/or lignin, the first temperature should be in the range of 200 to 240° C. and the second temperature should be in the range of 240 to 300° C.

According to a preferred embodiment of the method, the precursor fibers are continuously passed through a negative pressure or vacuum area to provide continuous processing. For good process results, the precursor fibers are preferably kept under defined tension during the process. A tension in the range between 0.5 and 10 N per 3 k fiber bundle has proven to be suitable.

For good and uniform processing, the gas atmosphere is preferably exchanged continuously or intermittently during the stabilization process. In particular, a gas flow, in particular compressed air, can be continuously passed through a process area which is kept at negative pressure. The flow rate depends on the dimensions of the process chamber and the amount and type of material being processed. In the case of a 2 meters process chamber and 2 meter 3 k fiber and 80 min residence time, a flow of 5 to 40 slm, in particular 10 to 35 slm is expected. In one embodiment, the precursor fibers are passed through at least one muffle furnace with at least two adjacent zones at different temperatures during the process.

The device for stabilizing precursor fibers for carbon fiber production in particular comprises: at least one elongated vacuum chamber for passing said precursor fibers therethrough, said vacuum chamber being evacuable to a pressure below 300 mbar; at least one air lock unit at one end of said at least one vacuum chamber for introducing a plurality of precursor fibers in a sealed manner into said at least one vacuum chamber; at least one air lock unit at one end of the at least one vacuum chamber, for extracting the plurality of precursor fibers from the at least one vacuum chamber in a sealed manner; and at least one heating unit having at least two individually controllable heating elements which are suitable for heating the at least one vacuum chamber to at least two different temperatures in longitudinally adjacent heating zones. Such a device allows the stabilization of precursor fibers under controlled process conditions.

For a continuous and good processing, the device preferably also has a transport unit which is suitable for continuously conveying precursor fibers through the vacuum chamber at a desired speed and under a desired tension. In particular, the transport device should be capable of keeping the precursor fibers under a defined tension during the transport with a force between 0.5 and 10N per 3 k fiber bundle.

According to one embodiment, the heating unit is configured to heat the at least one vacuum chamber in at least 3 heating zones to different temperatures. The heating unit should preferably be configured to heat the at least one vacuum chamber in a first heating zone to a first temperature in the range of 200 to 320° C. and in a second heating zone to a second temperature in the range of 280 to 400° C.

Preferably, the device comprises at least two vacuum chambers stacked on top of each other and at least one deflection unit, wherein the deflection unit connects stacked ends of the vacuum chambers in a vacuum-tight manner to form a continuous vacuum space and wherein the deflection unit comprises at least one fiber guide for guiding the precursor fibers from one vacuum chamber to the next.

BRIEF DESCRIPTION OF THE DRAWINGS

The invention is further explained below with reference to the drawings. In the drawings.

DESCRIPTION

Figure 1:
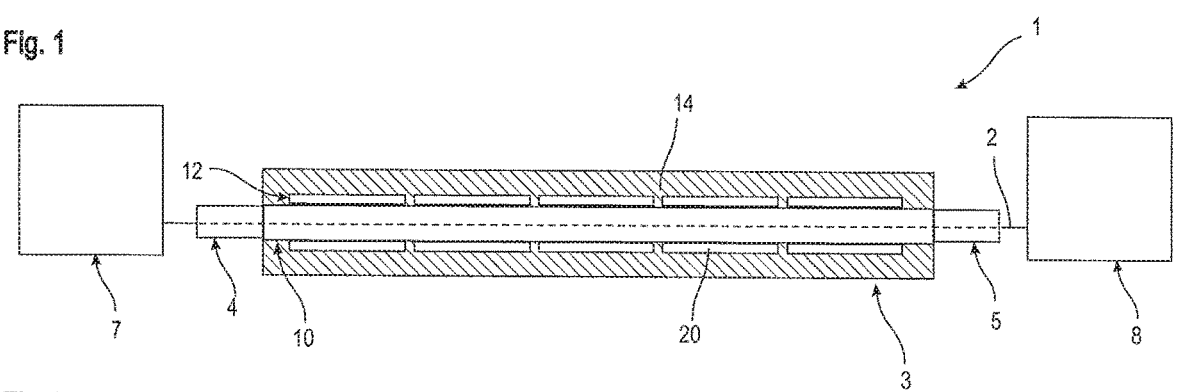
FIG. 1 a schematic side view of a stabilizing device according to the invention, wherein a process unit is shown in a sectional view.

Terms used in the description, such as above, below, left and right, refer to the representation in the drawings and are not restrictive, although they may also refer to preferred orientations. In the following, the basic construction of a stabilizing device 1 and an alternative is explained in more detail with reference to the figures. The same reference signs are used throughout the figures, where the same or similar elements are described.

Figure 2:
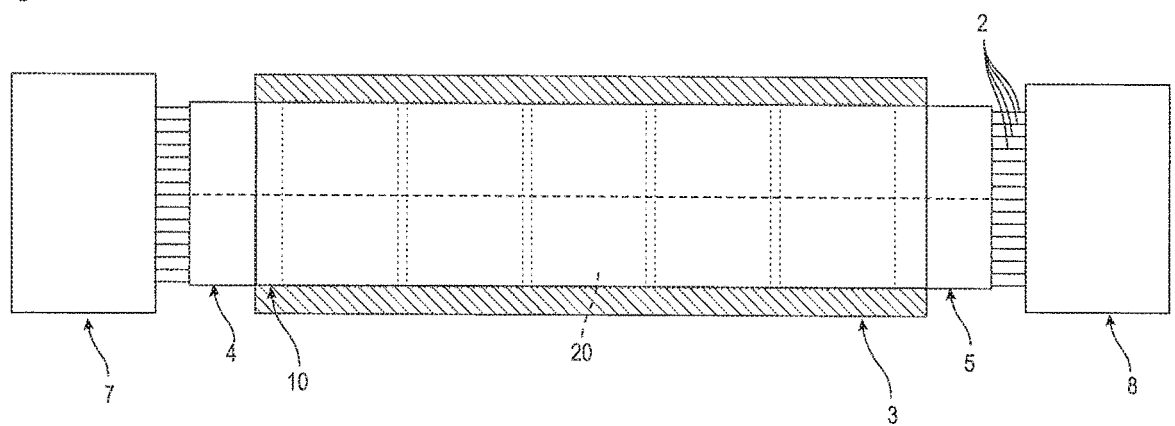
FIG. 2 a schematic top view of the device according to FIG. 1, wherein the process unit is again shown in a sectional view.

A basic structure of a stabilizing device 1 for precursor fibers 2 is shown in FIGS. 1 and 2. The stabilizing device 1 in substance has a central processing unit 3 with an inlet-side air lock unit 4 and an outlet-side air lock unit 5, as well as a fiber feeder 7 and a fiber take-up 8. The fiber feeder 7 and the fiber take-up 8 are strictly speaking not part of the stabilizing device 1 per se, as they only provide a feed of fibers to the stabilizing device 1 and a take-up of the fibers from the same. They are suitable for the continuous supply of precursor fibers 2 and for taking up the stabilized fibers, respectively. The units 7, 8 are each configured to supply or receive a plurality of precursor fibers 2 parallel to one another in one plane, as indicated in the plan view in FIG. 2. As such units are known and are available on the market in different versions, no further description of these units 7, 8 will be given.

The process unit 3 has an elongated vacuum chamber 10, a heating unit 12, which is directly adjacent to, in contact with or inside the vacuum chamber 10, and an insulation 14, which surrounds the vacuum chamber 10 and where needed the heating unit 14. Furthermore, the process unit 3 has at least one vacuum pump and a gas supply, which are connected to vacuum chamber 10 in a suitable manner. The vacuum pump and the gas supply system are not shown because the respective construction is not essential for the invention. The vacuum pump is designed in such a way that it can, for example, set a vacuum in the range of 12 to 300 mBar within the vacuum chamber 10, while the gas supply delivers a flow of 5 to 150 slm, for example, whereby ambient air can be used as the gas. When using ambient air, an oxygen partial pressure of 2.5 to 63 mBar with a chamber pressure of 12 to 300 mBar would result with an oxygen content of approx. 21%. A corresponding oxygen partial pressure could also be achieved at a higher chamber pressure, for example by using a gas mixture with an oxygen content of less than 21%. With a mixture of 50% pure nitrogen and 50% ambient air, the oxygen content would be reduced to about 11.5%, so that the chamber pressure could be adjusted to 24 to 600 mBar to obtain an oxygen partial pressure of 2.5 to 63 mBar. Therefore, the chamber pressures given below refer to the use of ambient air.

Figure 3:
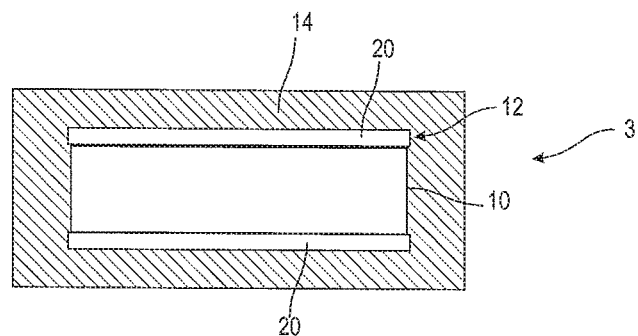
FIG. 3 A schematic cross-sectional view through a process unit of the device according to FIG. 1.

The vacuum chamber 10 has a rectangular cross-section, as can best be seen in FIG. 3. At its longitudinal ends the vacuum chamber 10 is connected to the air lock units 4, 5, via which precursor fibers 2 can be continuously introduced into the vacuum chamber 10, as explained below. The vacuum chamber 10 is made of a suitable heat-resistant material, which is preferably heat-resistant up to at least 400° C. The vacuum chamber 10, for example, has a length of 2 meters to 6 meters, although other lengths are of course also conceivable.

The heating unit 12 has a plurality of individually controllable heating plates 20, which are only schematically indicated in the plan view of FIG. 2. The heating plates 20 are arranged in pairs above and below the vacuum chamber 10 as seen in FIGS. 1 and 3. The heating plates each cover the entire width of vacuum chamber 10 and the pairs are adjacent to each other in the longitudinal direction. This creates zones that can be heated differently. In the illustration in FIGS. 1 and 2, five pairs of heating plates 20 are shown, resulting in five different heatable zones. The number of pairs of heating plates and the zones formed by them may differ from the number shown, but at least two zones should be present. Instead of heating plates 20, as shown, circumferential heating cassettes or other forms of heating elements could also be provided, as will be recognized by the skilled person. As mentioned above, the heating plates 20 or other suitable heating elements can be arranged inside the vacuum chamber 10 in such a way that adjacent heating zones are provided in the longitudinal direction.

The heating plates 20 are designed in such a way that they provide an essentially constant temperature in the vacuum chamber 10 within the respective zone over the width of the vacuum chamber and the covered length. In particular, they are designed to set a temperature in the range of 220 to 400'C. The insulation 14 surrounds the vacuum chamber 10 and the heating unit 12 to thermally insulate them from the environment, as is known in the technology for continuous furnaces.

Figure 4:
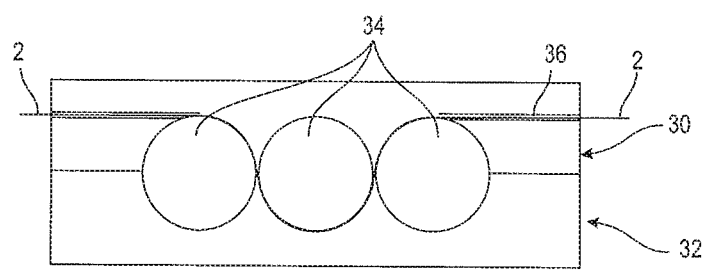
FIG. 4 a schematic longitudinal sectional view through an exemplary air lock unit of the stabilizing device according to FIG. 1.
Figure 5:
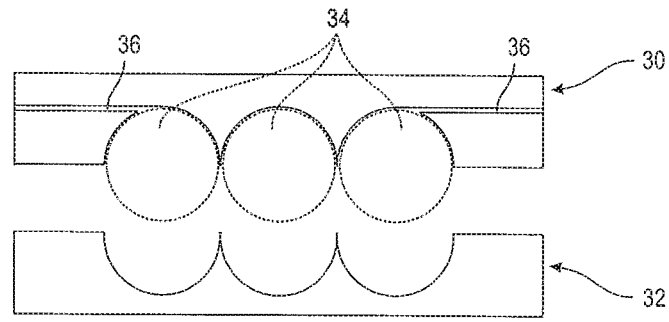
FIG. 5 an exploded view of the air lock unit according to FIG. 4.

FIGS. 4 and 5 are used to illustrate an exemplary design of an air lock unit 4, 5. The air lock units 4 and 5 can have essentially the same structure and several units can be arranged one behind the other to provide an improved vacuum seal.

In the embodiment shown, the air lock unit 4 has an upper housing part 30, a lower housing part 32 and three transport rollers 34. The housing parts 30, 32 are fastened to each other in an assembled state, whereby surfaces facing each other are connected pressure-tight, if necessary with the interposition of a sealing element. In the respective surfaces, semicircular receptacles are formed which, in cooperation with the receptacles of the other housing part, form round receptacles in cross-section, which are dimensioned for the tight-fitting reception of the transport rollers. In total, three of these receptacles are provided in a longitudinal direction of the respective housing parts 30, 32. The middle one of the receptacles is connected to the adjacent receptacles at a central plane. In addition, the upper part of the housing 30 has a slit-shaped lead-through at each of its end faces, which connects the respective end face with the apex of the adjacent outer semicircular receptacle.

The transport rollers are accommodated in the respective receptacles in such a way that the middle and outer rollers make contact with each other at the middle plane where the receptacles are connected or a small gap is formed between the rollers. The precursor fibers 2 can be passed in a sealed manner through the air lock unit 4, 5, as explained in more detail with respect to FIG. 4, assuming that the precursor fibers 2 run from left to right. The fiber passes through the small gap between the rollers.

As can be seen in FIG. 4, when the housing parts 30, 32 are assembled, precursor fibers 2 can be introduced via the left-hand feed-through 36 to the adjacent receptacle. There, the precursor fibers 2 are guided via the respective transport roller 34 to the middle receptacle and passed through the gap between the left and middle transport rollers. The precursor fibers 2 are then guided via the middle transport roller 34 to the right-hand receptacle, where they are then passed through the gap between the middle transport roller and the right-hand transport roller. The precursor fibers 2 are then guided via the right-hand transport roller to the right-hand feed-through 36 and out of the air lock unit. The transport rollers 34 are guided in the respective housing sections 30, 32 in such a way that they are sealed on the longitudinal ends and a gas flow from the left-hand feed-through 36 to the right-hand feed-through 36 is essentially only possible along the path taken by the precursor fibers 2. By means of an appropriate guidance of the fibers, it is possible to provide for sufficient gas tightness, while a continuous conveying of the precursor fibers 2 is possible. At least one of the transport rollers 34 is connected to a drive, so that the air lock units can simultaneously act as a drive for the precursor fibers 2. However, the transport rollers 34 can also be freewheeling and drive rollers can be provided outside the air lock units for the transport of the precursor fibers 2, which is currently the preferred embodiment. In particular, the drive should be able to set a transport speed of the precursor fibers 2 in the processing unit 3 and a tension of the precursor fibers 2.

An alternative air lock unit (not shown) has at least 2, preferably 3 individual air lock chambers, which, when arranged in a row, form 1 or 2 pressure stages. One air lock unit has a vacuum-tight housing body containing two horizontal rollers arranged parallel to one another and above each other, which are rotating in opposite directions. At least one of the rollers is driven and as a pair they have a transport function. The distance between the rollers can be adjusted. During operation, there is no gap or a very small gap between the rollers. The contact pressure between the rollers can be adjusted by means of an adjusting screw or another system, for example a pneumatic cylinder. Usually it is sufficient if one roller is fixed and the position of the other roller can be adjusted vertically. To achieve an optimum seal, at least one of the rollers has a soft, elastic surface coating. Sealing towards the housing can be achieved by an element that is sealed towards the housing and, for example, presses resiliently against the outer circumference of the rollers at a distance from the gap between the rollers.

An air lock unit having 3 lock chambers and 2 pressure stages, requires 2 vacuum pumps, whereby one is responsible for the first pressure stage and the second for the second pressure stage. The pressure stages of two air lock units, one on each inlet and outlet side, can be combined if desired.

Figure 6:
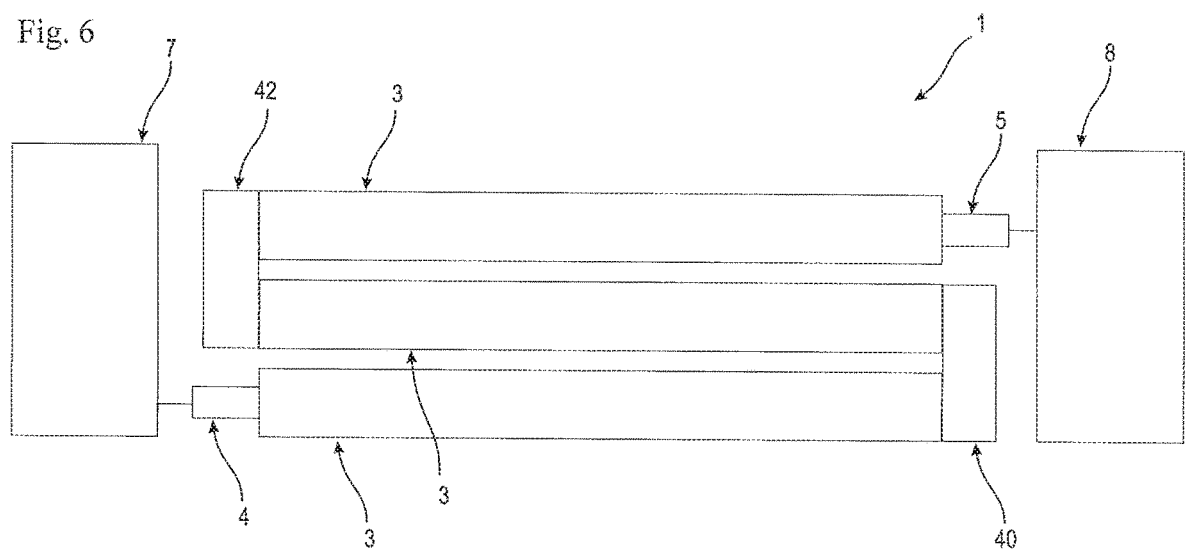
FIG. 6. a schematic side view of an alternative embodiment of a stabilizing device according to the invention.
Figure 7:
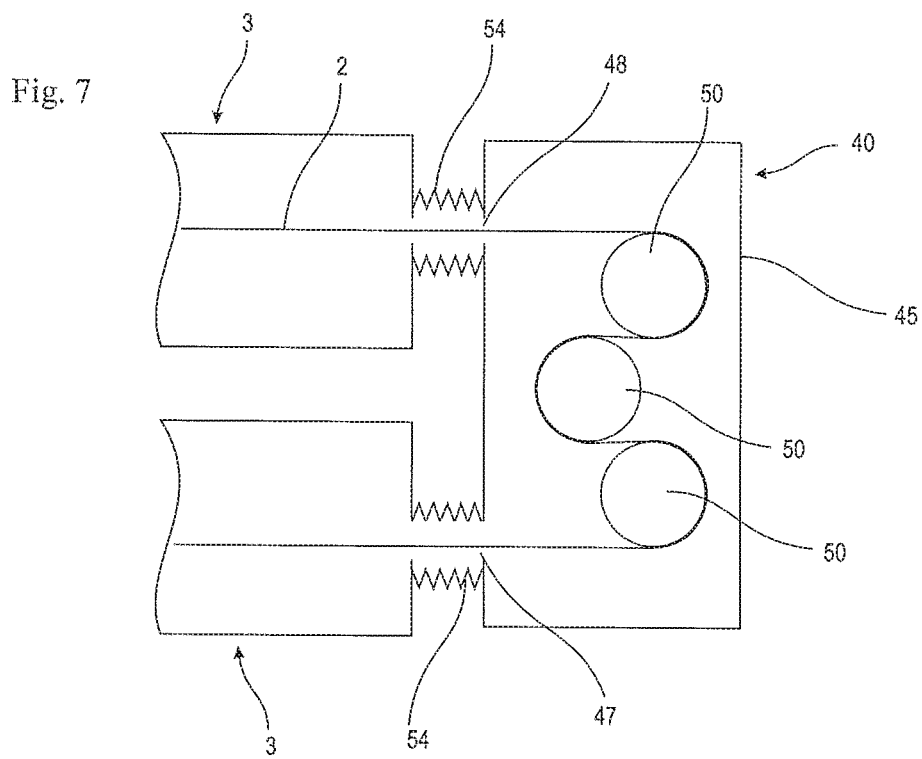
FIG. 7 an enlarged detailed view of a deflection unit according to the embodiment of FIG. 6.

FIG. 6 shows an alternative embodiment of a stabilizing device 1 with three vertically stacked processing units 3, an inlet-side air lock unit 4, an outlet-side air lock unit 5, a fiber feeder 7, a fiber take-up 8, as well as deflection units 40 and 41. The fiber feeder 7 and the fiber take-up 8 are again strictly speaking not part of the stabilizing device 1, since they only provide feeding a fiber to stabilizing device 1 and taking-up the fiber from the same. They are suitable for the continuous supply or take-up of precursor fibers 2. The units 7, 8 are each configured to supply or receiving a large number of precursor fibers 2 parallel to one another in one plane, as indicated in the plan view in FIG. 2. As such units are known and are available in the market in different versions, no further description of these units 7, 8 is given.

In the embodiment as shown, three process units 3, which can have the same structure as in the first version, are vertically stacked. The inlet-side air lock unit 4 is mounted on the left side of the lowest process unit 3 and the outlet-side air lock unit 5 is mounted on the right side of the upper process unit 3. The air lock units 4, 5 can again have essentially the same design as in the first embodiment.

The right end of the lower process unit 3 is connected to the right end of the middle process unit 3 in a vacuum-tightly manner via the deflection unit 40. The left end of the middle process unit 3 is in turn connected to the left end of the upper process unit 3 in a vacuum-tight manner via the deflection unit 42.

The deflection units 40. 42 are essentially of the same design and in the following the deflection unit 40 is described in more detail. The deflection unit 40 has a vacuum-tight housing 45, which has two feed-throughs 47, 48 in a side wall of the housing 45, as well as transport and guide rollers 50. The housing 45 has a suitable shape and size that it can be attached to the ends of two stacked process units 3 to connect them. In so doing, the feed-throughs 47, 48 in the side wall are aligned with corresponding openings in the ends of the processing units 3. In particular, the deflection unit is connected to the respective ends of the process units 3 via bellows units 54 in order to enable a vacuum-tight but flexible connection between the units. This is particularly advantageous as the process units 3 are heated during operation and can expand thermally. A flexible bellows connection as shown can prevent stresses between the different units. Alternatively, it would also be possible to mount the deflection unit 40 directly, i.e. rigidly, to the ends of the process units 3.

The transport and guide rollers 50 are arranged offset to each other and above each other in such a way that the precursor fibers 2 can be fed through one of the feed-throughs 47, around the transport and guide rollers 50 and out of the other feed-through 48. In the illustration, three transport and guide rollers 50 are provided, of which, for example, the upper and the lower are fixed, while the middle one is designed as a dancer roller which can move in the horizontal direction, for example, to adjust a tension of the precursor fibers 2 and/or to absorb fluctuations occurring during the transport of the fibers. At least one of the transport and guide rollers 50 can be connected to a drive motor to provide an active drive during the deflection. The drive motor can be located inside the vacuum housing 45 or outside, in which case a vacuum-tight feed-through for the drive shaft should be provided. The number and arrangement of the transport and guide rollers can deviate from the number and arrangement as shown, as the person skilled in the art will see. In particular, the tension of the precursor fibers can be measured and adjusted in the area of the deflection units. This can be done, for example, via the transport and guide rollers 50. This allows a defined tension to be set within the respective process units 3.

In the following, a stabilization process is explained in more detail with reference to the stabilizing device 1 as shown in FIG. 1. The exemplary values given here for different parameters are examples and preferred value ranges are defined herein below. First, a large number of precursor fibers 2—for example PAN fibers—which extend in parallel, are fed from the feeder unit 7 via the air lock unit 4 into the process unit 3. From processing unit 3, the precursor fibers 2 are then moved via the air lock unit 5 to the take-up unit 8, where they are taken up again. The process unit is then brought to a negative pressure in the range of 12 to 300 mBar. A range of 50 to 200 mBar has so far proved to be particularly advantageous. Via the gas supply the vacuum chamber 10 is supplied with ambient air, which is evacuated again via the vacuum pump. For example, a flow of 50 slm (standard liters per minute) is set. The evacuated air is cleaned by an appropriate treatment unit in order to separate or render harmless undesirable gases, such as CO, $CO_2$, $NH_3$ or HCN, which may be generated during operation. As mentioned before, the pressures given are for the use of ambient air, and they are aimed at achieving an oxygen partial pressure of 2.5 to 63 mBar (chamber pressure 12 to 300 mBar) or 10.5 to 42 mBar (chamber pressure 50 to 200 mBar). If gases other than ambient air are used, other chamber pressures may be set to obtain the preferred oxygen partial pressures.

Furthermore, the heating plates 20 are controlled so that they generate a constant temperature in the vacuum chamber 10 in their respective zone. For example, a temperature of 260° C. is set in the first, left-hand zone. In the adjacent zones, for example, temperatures of 320° C., 360° C., 380° C. and 400° C. are then set. There is therefore a 60° C. temperature increase between the first two zones and a 40° C. temperature increase between the second and third zones. The temperature increase is constant over the last three zones. The precursor fibers 2 are now moved through the processing unit 3 at a predetermined speed, the speed being set so that the precursor fibers 2 take about 20 minutes to pass through a respective one of the heating zones. As the skilled person will see, the dwell time of the precursor fibers at the different temperatures is adjusted via the speed. This can be adjusted according to the needs.

In the respective heating zone, the precursor fibers 2 are rapidly heated to the respective temperature and kept at this temperature during passage through the zone. Thus, in the above example, the precursor fibers 2 are first heated to 260° C. in a controlled vacuum gas atmosphere in the vacuum chamber 10 and kept at this temperature for about 20 minutes before being heated to 320° C. and kept at this temperature again for about 20 minutes. The precursor fibers 2 are then heated to 360° C. and kept at this temperature for about 20 minutes. Subsequently, they are treated at 380 and 400° C. for 20 minutes each. As the precursor fibers 2 pass through the heating zones in the vacuum chamber 10, they are being stabilized.

The inventors have found that higher temperatures can be used in the controlled negative pressure atmosphere than at atmospheric pressure in air without the precursor fibers 2 burning or being thermally damaged. In this way, it was possible to produce in a reproducible manner, uniformly stabilized precursor fibers 2 having a high density of more than 1.38 $g/cm^3$ and especially more than 1.42 $g/cm^3$.

The inventors have found that at least one increase in temperature is advantageous, whereby for PAN fibers the first temperature is in the range of 220 to 320° C. and the second temperature is in the range of 280 to 400° C. Here, the second temperature represents the highest temperature within the vacuum chamber 10, while lower temperatures can be set before the first temperature. Preferably, the first temperature is in the range of 260 to 320° C. and the second temperature is in the range of 300 to 400° C., which is considerably higher than the previously used state-of-the-art temperatures. Preferably, the second temperature is at least 30° C., preferably at least 40° C. higher than the first temperature. The temperature can be increased in steps, wherein the temperature difference between successive steps is at least 5° C., in particular at least 10° C., and wherein the precursor fibers are being kept at the at least one intermediate temperature for a predetermined period of time. It has proved to be advantageous when the temperature ranges of two subsequent levels overlap. It is therefore advantageous if the re-entry of the fibers into the next level takes place at the same or even at a lower temperature than the temperature when exiting the previous level. The dwell time per temperature stage should preferably be at least 5 minutes, although the dwell time may be shorter when small temperature increments are being used. In the above embodiment, the dwell time depends on the length of the respective heating zone and the transport speed of the precursor fibers 2. While the length of the individual heating zones is predefined, the dwell time can be adjusted via the transport speed. Of course, heating zones can also be heated to the same temperature to for example multiply the dwell time at a certain temperature.

The above process description was based on a single process unit 3 according to FIG. 1. In the case of an embodiment according to FIG. 6 with three process units 3 stacked above each other, the procedure is similar. Here, for example, only one or two heating zones per process unit 3 can be provided in which the different temperatures are set. The deflection units are not heated, so that during the transition from one process unit 3 to the next there may be a slight cooling of the precursor fibers 2, but this is not considered harmful, as the stabilization achieved up to this point is maintained. However, if problems were to arise from an intermediate cooling, it would also be possible to control the temperature of the respective deflection units accordingly. The embodiment according to FIG. 6 allows a more flexible temperature setting with several heating zones and a smaller footprint. Instead of the three stacked process units, of course, only two or more process units can be stacked, wherein with an even number of process units 3 the precursor fibers 2 may have to be supplied and extracted from the same side.

Other precursor fibers can be stabilized accordingly, wherein other temperature ranges and dwell times can be used. The inventors have found out that by reducing the pressure in the process area, especially by reducing the partial pressure of oxygen, the precursor fibers for the carbon fiber production can be stabilized at higher temperatures. On the one hand, this can accelerate stabilization and, on the other hand, it can also have a positive influence on fiber quality. In particular, an oxygen partial pressure between 2.5 and 63 mBar, preferably between 10.5 and 42 mBar, has proven to be advantageous. Among other things, a negative pressure can also facilitate the outgassing of the fibers.

The application was explained in more detail on the basis of preferred embodiments, without being limited to the concrete designs.

The invention claimed is:

1. A method for stabilizing precursor fibers for the carbon fiber production, comprising the following steps:
   heating the precursor fibers to a first temperature and maintaining the precursor fibers at the first temperature for a predetermined period of time; and
   subsequently heating the precursor fibers to at least a second temperature higher than the first temperature and maintaining the precursor fibers at the second temperature for a predetermined period of time;
   wherein the precursor fibers are in a gas atmosphere with a negative pressure in a range between 12 mBar and 300 mBar during the respective heating and between the heating steps.

2. The method according to claim 1, wherein the precursor fibers are in a gas atmosphere with a negative pressure in a range between 50 mBar and 200 mBar during the respective heating and between the heating steps.

3. A method for stabilizing precursor fibers for the carbon fiber production, comprising the following steps:
   heating the precursor fibers to a first temperature and maintaining the precursor fibers at the first temperature for a predetermined period of time; and
   subsequently heating the precursor fibers to at least a second temperature higher than the first temperature and maintaining the precursor fibers at the second temperature for a predetermined period of time;
   wherein the precursor fibers are in a gas atmosphere having an oxygen partial pressure in a range between 2.5 mBar and 63 mBar during the respective heating and between the heating steps.

4. The method according to claim 3, wherein the precursor fibers are in a gas atmosphere having an oxygen partial pressure in a range between 10.5 mBar and 42 mBar during the respective heating and between the heating steps.

5. The method according claim 1, wherein the precursor fibers are heated stepwise via at least one further intermediate temperature from the first temperature to the second temperature, wherein the temperature difference between successive steps is at least 5° C and wherein precursor fibers are maintained at the at least one intermediate temperature for a predetermined period of time.

6. The method according to claim 3, wherein temporally successive stages can have a negative temperature difference, so that there is an interim cooling of the precursor fibers, wherein the interim cooling does not lower the temperature below the first temperature.

7. The method according to claim 1, wherein the second temperature is at least 30° C. higher than the first temperature.

8. The method according to claim 1, wherein the precursor fibers are maintained at the first temperature, the second temperature and at least one optional intermediate temperature for at least 10 minutes.

9. The method according to claim 1, wherein the precursor fibers are PAN fibers and the first temperature is in the range of 220 to 320° C. and the second temperature is in the range of 280 to 400° C.

10. The method according to claim 1, wherein the first temperature is in the range of 260 to 320° C. and the second temperature is in the range of 300 to 380° C.

11. The method according to claim 1, wherein the precursor fibers are based on cellulose and/or lignin and the first temperature is in the range of 200 to 240° C. and the second temperature is in the range of 240 to 300° C.

12. The method according to claim 1, wherein the precursor fibers are continuously passed through a negative pressure region during the process.

13. The method according to claim 1, wherein the precursor fibers are kept under a defined tension during the method.

14. The method according to claim 1, wherein the gas atmosphere is exchanged continuously or intermittently during the stabilization process.

15. The method according to claim 1, wherein the precursor fibers are moved through at least one muffle furnace having at least two adjacent zones of different temperature during the method.

16. An apparatus for stabilizing precursor fibers for the carbon fiber production according to the method of claim 1, comprising:

at least one elongated vacuum chamber for receiving the precursor fibers in a gas atmosphere defined therein, wherein the vacuum chamber is evacuable to a negative pressure below 300 mBar; and at least one heating unit configured to heat the precursor fibers in the gas atmosphere to a first temperature and to maintain the precursor fibers at the first temperature for a predetermined period of time, wherein the at least one heating unit is further configured to subsequently heat the precursor fibers in the gas atmosphere to at least a second temperature, higher than the first temperature, and to maintain the precursor fibers at the second temperature for a predetermined period of time.

17. The apparatus according to claim 16, further comprising a transport unit configured to continuously transporting precursor fibers through the vacuum chamber at a desired speed and under a desired tension.

18. The apparatus according to claim 17, wherein the transport device is configured to maintain the precursor fibers under a defined tension during the transport with a force between 0.5 and 10N per 3 k fiber bundle.

19. The apparatus according to claim 16, wherein the heating unit is configured to heat the at least one vacuum chamber to different temperatures in at least 3 heating zones.

20. The apparatus according to claim 16, wherein the heating unit is configured to heat the at least one vacuum chamber in a first heating zone to a first temperature in the range of 200 to 320° C. and in a second heating zone to a second temperature in the range of 280 to 400° C.

21. The apparatus according to claim 16, comprising at least two stacked vacuum chambers and at least one deflection unit, wherein the deflection unit connects ends of the vacuum chambers arranged one over the other in a vacuum-tight manner to form a continuous vacuum space, and wherein the deflection unit comprises at least one fiber guide for guiding the precursor fibers from one vacuum chamber to the next.

22. The apparatus according to claim 16, further comprising:

at least one air lock unit at one end of the at least one vacuum chamber for introducing the precursor fibers into the at least one vacuum chamber in a sealed manner;

at least one air lock unit at one end of the at least one vacuum chamber for extracting the precursor fibers from the at least one vacuum chamber in a sealed manner; and at least one heating unit having at least two individually controllable heating elements which are configured to heat the at least one vacuum chamber in heating zones, which are adjacent in the longitudinal direction of the at least one vacuum chamber, to at least two different temperatures.

* * * * *